US012755312B2

(12) United States Patent
Singhai et al.

(10) Patent No.: US 12,755,312 B2
(45) Date of Patent: Oct. 6, 2026

(54) CHAT INTERFACE WITH CHATBOT AGENT SUPPORTED BY LANGUAGE MODELS FOR PLACING GROUP ORDERS

(71) Applicant: Maplebear Inc., San Francisco, CA (US)

(72) Inventors: Mridul Singhai, San Francisco, CA (US); Reece Boyd, Brentwood, TN (US); Joseph Olivier, San Bruno, CA (US); Lukasz Czekaj, North Las Vegas, NV (US); Brent Luna, Oakland, CA (US); Nathan Marks, Toronto (CA)

(73) Assignee: Maplebear Inc., San Francisco, CA (US)

( * ) Notice: Subject to any disclaimer, the term of this patent is extended or adjusted under 35 U.S.C. 154(b) by 216 days.

(21) Appl. No.: 18/672,693

(22) Filed: May 23, 2024

(65) Prior Publication Data

US 2025/0363545 A1 Nov. 27, 2025

(51) Int. Cl.

| | |
|---|---|
| ***G06F 40/35*** | (2020.01) |
| ***G06F 40/40*** | (2020.01) |
| ***G06Q 30/0601*** | (2023.01) |
| ***H04L 51/02*** | (2022.01) |

(52) U.S. Cl.
CPC ......... *G06Q 30/0633* (2013.01); *G06F 40/35* (2020.01); *G06F 40/40* (2020.01); *H04L 51/02* (2013.01)

(58) Field of Classification Search
CPC ..... G06Q 30/0633; G06F 40/35; G06F 40/40; H04L 51/02
See application file for complete search history.

(56) References Cited

U.S. PATENT DOCUMENTS

| | | | | |
|---|---|---|---|---|
| 2025/0005297 | A1* | 1/2025 | Davish | G06F 40/40 |
| 2025/0315875 | A1* | 10/2025 | Boyd | G06Q 30/0603 |
| 2025/0322438 | A1* | 10/2025 | Olivier | G06Q 30/0633 |

FOREIGN PATENT DOCUMENTS

| | | | |
|---|---|---|---|
| EP | 3735880 A1 * | 11/2020 | G01N 27/02 |

* cited by examiner

*Primary Examiner* — Richemond Dorvil
*Assistant Examiner* — Adam Michael Weaver
(74) *Attorney, Agent, or Firm* — Fenwick & West LLP

(57) ABSTRACT

A chat interface supported by language models is used for generating a group order at an online system based on a conversation between multiple users. Upon receiving, via the chat interface, input data with information about the conversation, the online system requests a first language model to generate, based on the input data, a list of ingredients. The online system then requests a second language model to map the list of ingredients into a list of items at a retailer associated with the online system. Upon generation of the list of items, the online system causes the chat interface to display content prompting approval by the users for conversion of the list of items. Responsive to the approval, the online system places the group order that includes the list of items for delivery to a user of the online system.

20 Claims, 5 Drawing Sheets

CHAT INTERFACE WITH CHATBOT AGENT SUPPORTED BY LANGUAGE MODELS FOR PLACING GROUP ORDERS

BACKGROUND

Online systems, such as online concierge systems, are widely used nowadays for placing online orders so that users of the online systems can perform online purchases of various items (e.g., groceries) offered by retailers. An online order is typically placed by a single user of an online system via a user interface of the online system, and the user interface typically facilitates the placement of order by a single user. Hence, it is desirable to improve a user interface of the online system to enable multiple users to collaborate in building an online order across multiple modalities (e.g., using texts, images, etc.). However, there is a technical problem of how to generate a user interface of the online system that supports multiple users discussing a group order (e.g., meal), and that automatically places the group order for delivery.

SUMMARY

Embodiments of the present disclosure are directed to using a chat interface with a chatbot agent supported by language models for placing a group order at an online system (e.g., online concierge system) that is built by multiple users of the online system.

In accordance with one or more aspects of the disclosure, the online system receives, via a chat interface of an online system, input data with information about a conversation between a plurality of users of the online system about a group order for the plurality of users. The online system generates a first prompt for input into an ingredient generation large language model (LLM), the first prompt including the received input data and a request for generating a list of ingredients for the group order. The online system requests the ingredient generation LLM to generate, based on the first prompt input into the ingredient generation LLM, the list of ingredients and metadata associated with the plurality of users. The online system generates a second prompt for input into an item generation LLM, the second prompt including the list of ingredients, the metadata and a request for generating a list of items at a retailer associated with the online system for the group order. The online system requests the item generation LLM to generate, based on the second prompt input into the item generation LLM, the list of items at the retailer. The online system causes the chat interface to display content prompting approval by the plurality of users for conversion of the list of items. Responsive to the approval, the online system places the group order comprising the list of items at the online system for delivery to a user of the plurality of users.

DETAILED DESCRIPTION

Figure 1A:
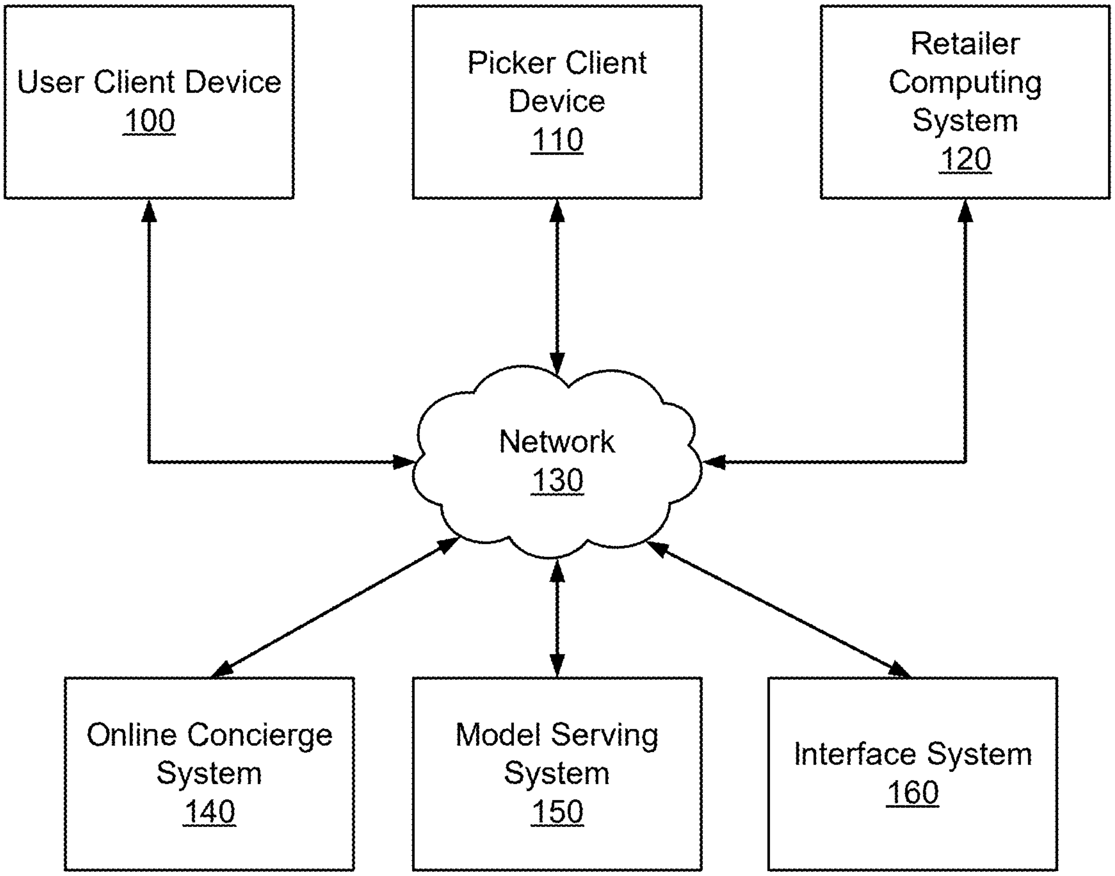
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1 includes a user client device 100, a picker client device 110, a retailer computing system 120, a network 130, an online concierge system 140, a model serving system, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1A, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 provides a chat interface through which multiple users can discuss their intent to purchase a set of items, such as groceries for a meal. The online concierge system 140 also provides a chatbot agent that participates in the chat. The chatbot agent may be backed by trained machine-learning models (e.g., language models) to convert multi-modal inputs from multiple users provided via the chat interface into an order of items. The chat interface along with the chatbot agent and the machine-learning models may form an agentic chat system. The agentic chat system may first generate a list of ingredients based on the chat and possibly on information about the participating users that is maintained by the online concierge system 140. After that, the agentic chat system may map the list of ingredients to a list of actual products (i.e., items) available at a retailer associated with the online concierge system 140. Finally, once the users confirm the list of items, the agentic chat system may facilitate the checkout flow to complete purchase of the items.

Hence, the online concierge system 140 presented herein integrates the agentic chat system that supports building a group order based on inputs from multiple parties. The agentic chat system may include a chat interface that faces the users, a chatbot agent that participates in the chat interface, a machine-learning model (e.g., language model) that controls the chatbot agent, and additional machine-learning models (e.g., language models) that run at the backend of the agentic chat system and communicate with the machine-learning model that controls the chatbot agent and handles the flow and state machine of the agentic chat system. Therefore, the agentic chat system is a collection of machine-learning models (e.g., language models) that work together to form an agent for the user.

The agentic chat system presented herein can take inputs from multiple users and modalities and synthesize these inputs into suggestions for the entire group, including cart building for a recipe or product recommendation. The types of inputs supported by the agentic chat system may include messaging between users of the online concierge system 140 using an application of the online concierge system 140 running on user client devices 100 associated with the users, screenshots of short message service (SMS) messages exchanged between multiple parties (e.g., outside of the application of the online concierge system 140), voice recording of a conversation between multiple parties, etc. Different input modalities may facilitate cart building and suggestions between two or more people in a family, relationship, household, or friends trying to get together to make a meal. Additionally, the agentic chat system may facilitate splitting payments between parties, based on their preference. Additionally, the agentic chat system may be used for website navigation across a domain of the online concierge system 140, scraping of a catalog of items stored at the online concierge system 140, selection of a retail location (e.g., grocery store) based on the required ingredients, identification of the address or location of the parties involved, adding items to a cart, setting replacement preferences, etc.

The model serving system 150 receives requests from the online concierge system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online concierge system 140 may employ multiple LLMs of the model serving system 150 to integrate an agentic chat system that supports building a group order based on inputs from multiple users. A first LLM of the model serving system 150 may be used for receiving multi-modal inputs from the chat interface to allow the users to either speak, write, or send pictures in a chatroom setting. Additionally, the first LLM may feed its output to other LLMs of the model serving system 150 that together form the agentic chat system. The online concierge system 140 may prepare (e.g., via a prompt generation module 270 in FIG. 2) a prompt for input to the first LLM. The prompt may include multi-modal inputs related to a conversation between multiple users about a potential meal or recipe, such as textual messages exchanged between the users on an application of the online concierge system 140 running on user client devices 100, screenshots of SMS messages exchanged between multiple parties (e.g., outside of the application of the online concierge system 140), voice recording of the conversation, images of the potential meal, etc.

An example prompt for input into the first LLM that includes conversational inputs of different modalities and a request for generating a group order can be as follows.

Person A (e.g., speech-to-text input for the first LLM via the chat interface):

"Hey man! What do you want to eat for dinner tonight? I'm thinking spaghetti, we haven't had that in awhile."

Person B (e.g., text and image inputs for the first LLM via the chat interface):

"I'm not really sure I want that, check out this picture of these tacos that I saw! Can we do that instead?"

Person A (e.g., speech-to-text input for the first LLM via the chat interface):

"That looks delicious! Let's do it. Chatbot, what do you think? We plan to have dinner at my house tonight. Can you build us a basket and have it delivered here before 5 PM?"

At this point, at the backend of the agentic chat system, the first LLM may generate a response to the prompt based on execution of the machine-learning model using the prompt. The response may include a list of ingredients (e.g., shopping list) for the group order. In this particular example, the first LLM can generate a list of ingredients for chicken tacos. Note that the image that was sent from Person B via the chat interface to the first LLM could be actually of fish tacos, but based on Person B's previous orders, the first LLM was tuned to infer that Person B may have a dietary restriction that prevents this user from consuming fish, whether it is health-related or just personal preference.

In one or more embodiments, the first LLM passes the generated list of ingredients to a second LLM of the model serving system 150 as part of a second prompt for input to the second LLM. The second prompt for input to the second LLM may also include a request for the second LLM (e.g., as generated by the first LLM) to build a cart based on availability of ingredients in the list of ingredients as well as on location information (e.g., destination of the order). The second LLM may generate a second response to the second prompt based on execution of the machine-learning model using the second prompt. The second response may include a list of items from a catalog of items (e.g., as available at the model serving system 150 or at the data store 240), i.e., the second LLM may map the list of ingredients in the second prompt to specific items in the catalog of items constrained to a destination of the order. Note that the first LLM can infer the destination of the order based on the conversation between the involved parties and provide the inferred destination of the order as part of the second prompt to the second LLM.

The online concierge system 140 may import the second response from the model serving system 150 and use the second response to populate the chat interface with the list of items. At this point, the chatbot can be prompted to populate the chat interface with a corresponding textual response, such as:

Chatbot (e.g., text populating the chat interface):

"Certainly, based on your suggestions, I have built a cart for chicken tacos."

Person A:

Looks good to me! Are you ok splitting the order 50-50?

Person B:

Yea, sounds good, I'll see you tonight.

Chatbot:

"Fantastic! I have placed the order and have used your saved payment information to split the order 50-50, enjoy your dinner!"

At the backend of the agentic chat system, a third prompt for input to a third LLM of the model serving system 150 may be prepared (e.g., via the first LLM) with a request to build a checkout form and facilitate a payment for the group order. For example, the first LLM may feed the third prompt for input to the third LLM with information about a delivery time, delivery location, and an agreed payment method (e.g., payment split between the users). The first LLM may trigger the third LLM once the users' consensus is reached after the cart is built. The third LLM may generate a third response to the third prompt based on execution of the machine-learning model using the third prompt. In particular, the third LLM may fill out and complete the checkout form for the users. Before placing the order for delivery, the third LLM may require receiving a signal as part of the third prompt that indicates users' approval of the order. The third LLM may also make updates to the checkout form based on the users' feedback provided to the third LLM from the first LLM. Additionally, the first LLM may re-trigger the third LLM based on new information received from the participants in the conversation.

In one or more embodiments, the task for the model serving system 150 is based on knowledge of the online concierge system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
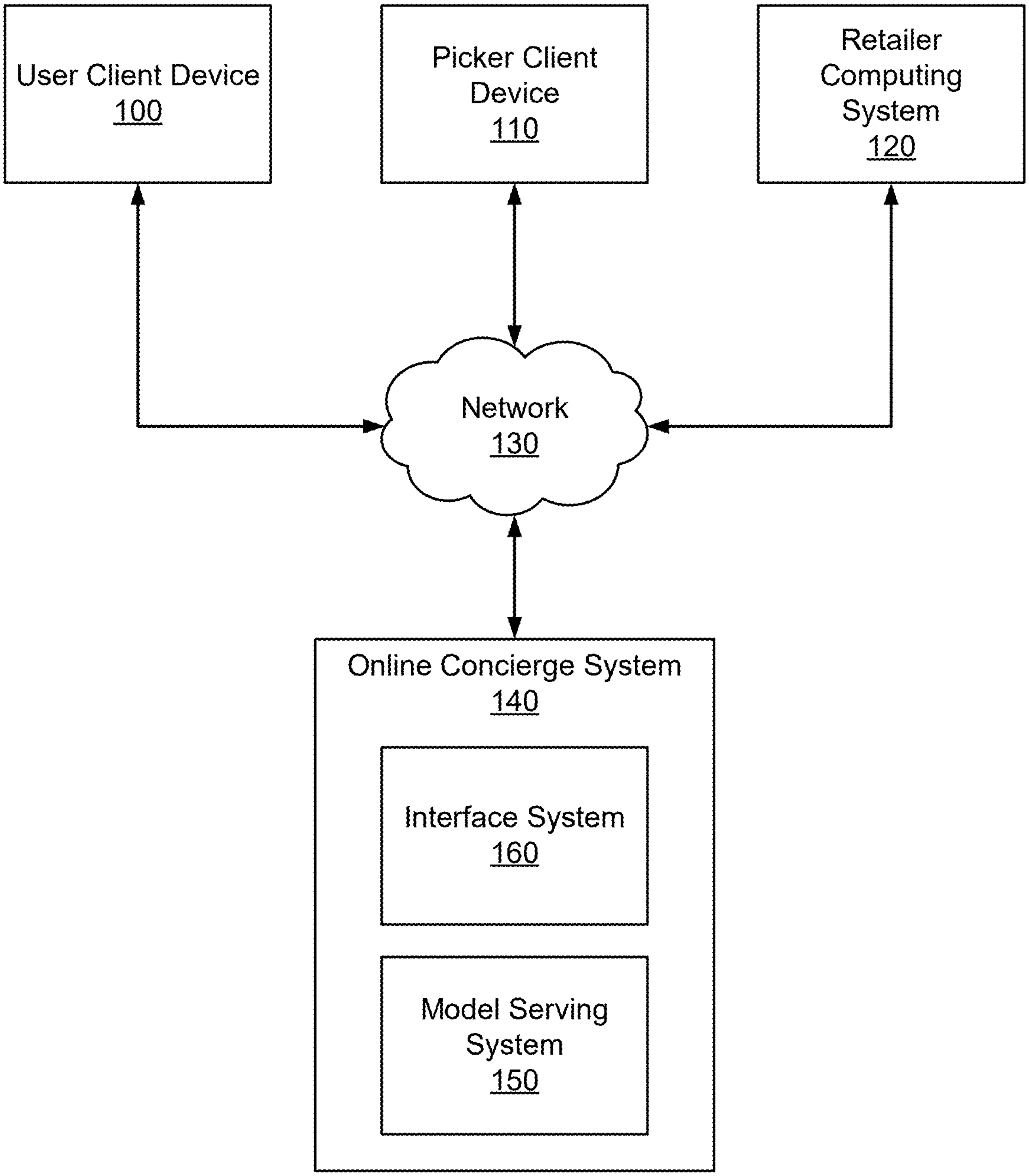
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a user client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Figure 2:
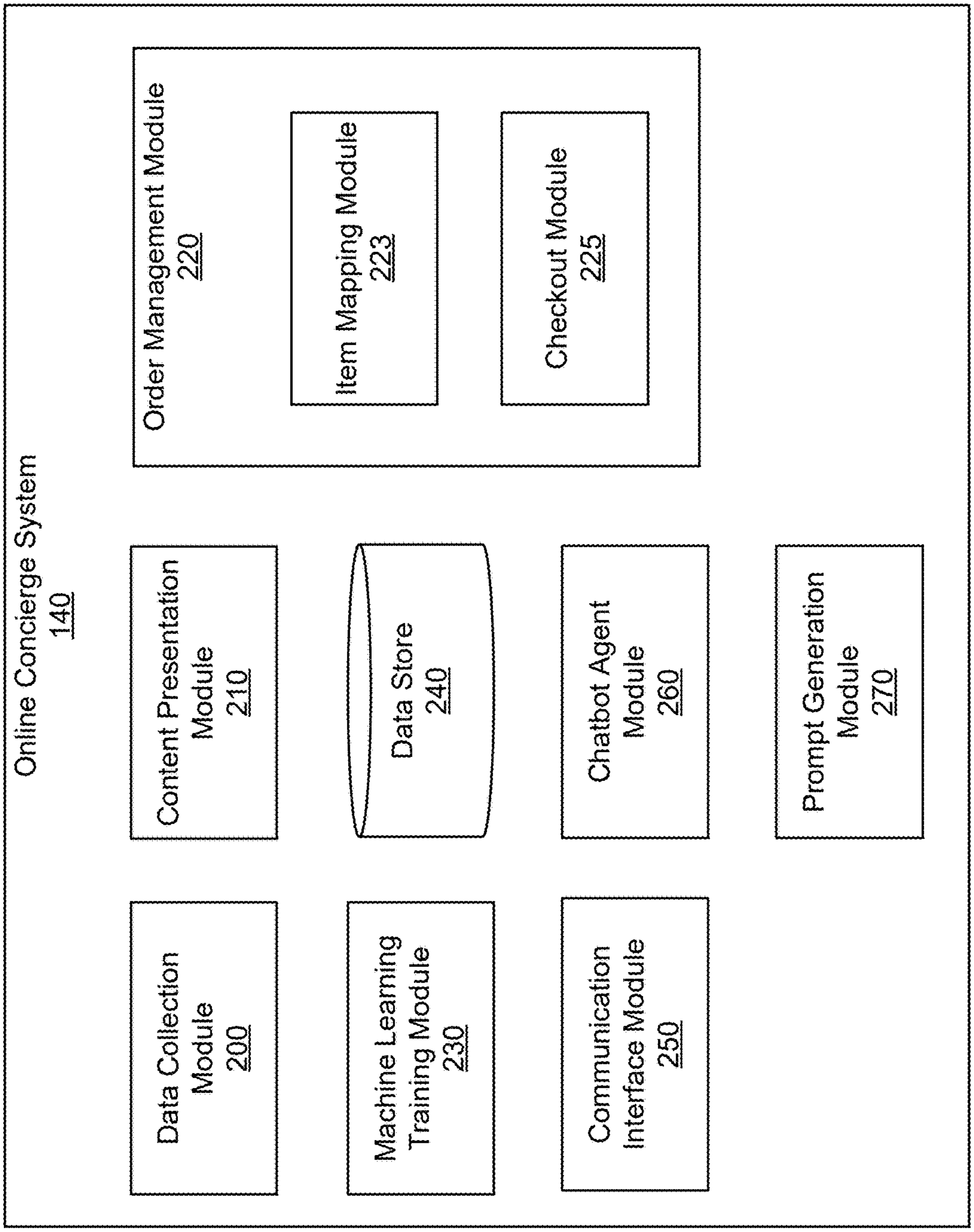
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a communication interface module 250, a chatbot agent module 260, and a prompt generation module 270. The order management module 220 may include a mapping module 223 and a checkout module 225.

Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online concierge system 140. In one or more other embodiments, when the model serving system 150 is included in the online concierge system 140, the machine-learning training module 230 may further train parameters of the machine-learning model based on data specific to the online concierge system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

The communication interface module 250 may receive inputs from one or more users of the online concierge system 140 related to a conversation about a potential group order. The inputs received at the communication interface module 250 may be entered via a chat interface of an application of the online concierge system 140 running on one or more user client devices 100 associated with the one or more users. The communication interface module 250 may receive the inputs of multiple modalities entered via the chat interface. The communication interface module 250 along with the chat interface may allow users to upload inputs of various modalities, such as a text conversation, images of a text conversation (e.g., that occurred outside of the application of the online concierge system 140), images of meals, audio clips of a conversation that the users have had within their group, etc. The chat interface supported by the communication interface module 250 may thus allow multiple users to collaborate on what they might want to order at the online concierge system 140.

The chatbot agent module 260 controls a chatbot agent that can appear at the chat interface as an additional participant in the conversion about the potential order. The chatbot agent may require a prompt from one or more users that participate in the conversation to invoke participation of the chatbot agent in the conversation. In one or more embodiments, the chatbot agent module 260 accesses a chatbot prediction model (e.g., machine-learning model) that is trained (e.g., via the machine-learning training model 130) to know when it is appropriate for the chatbot agent to interject the conversation. The chatbot agent module 260 may apply the chatbot prediction model that is trained to continually predict whether the conversation has given enough information for generating a list of ingredients for an order. The chatbot agent module 260 may deploy the chatbot prediction model to run a machine-learning algorithm to output, based on conversational inputs, a score that is indicative of a confidence that the information provided by the conversation passes a threshold for generating the list of ingredients for the order. When the score is greater than the threshold score, the chatbot agent module 260 may invoke the participation of the chatbot agent in the conversation. A set of parameters for the chatbot prediction model may be stored at one or more non-transitory computer-readable media of the chatbot agent module 260. Alternatively, the set of parameters for the chatbot prediction model may be stored at one or more non-transitory computer-readable media of the data store 240.

The prompt generation module 270 may prompt a first LLM (e.g., first LLM of the model serving system 150) to synthesize inputs from multiple sources into an intent for a group of users that is represented by a list of ingredients (e.g., suggestion for a recipe or products based on the conversation). The prompt generation module 270 may further generate a prompt for input into the first LLM. The prompt may include the aforementioned inputs of different modalities entered by the one or more users via the chat interface of the online concierge system 140 and received by the prompt generation module 270 from the communication interface module 250. Additionally, the prompt generation module 270 may retrieve, e.g., from the data store 240, past purchase data associated with the users that participate in the conversation, information about preferences of the users, some other user-related data, or some combination thereof. The prompt generation module 270 may then include the retrieved user-related data into the prompt. The prompt generation module 270 may further include a request into the prompt to ask the first LLM to generate the list of ingredients.

Based on the prompt input into the first LLM, the first LLM may generate a response that includes the list of ingredients. The response provided by the first LLM may be imported to the online concierge system 140, e.g., via the communication interface module 250 so that the list of ingredients is displayed at the chat interface. The response generated by the first LLM may further include metadata with information about user preferences inferred from the conversational inputs, such as, "Let's split this 3 ways, use our visa cards," "We are going to eat at Jennifer's house tonight, let's have our order delivered there," "Make sure it gets here as soon as possible." The metadata output by the first LLM may feed a second LLM (e.g., second LLM of the model serving system 150) and/or a third LLM (e.g., third LLM of the model serving system 150).

In one or more embodiments, the first LLM is given access to one or more application programming interfaces (APIs) of the online concierge system 140. In such cases, the first LLM may utilize the one or more APIs to obtain content of the users' previous orders and gauge the users' preferences from the content of the previous orders. Additionally, the first LLM may utilize the one or more APIs to obtain information about feedback given by the users on previous orders. This feedback information may be used to tune the first LLM so that the first LLM can infer what the users care about most, including how they respond to, e.g., lower found rates, which may constrain the types of suggestions and recipes that are suggested by the first LLM.

The first LLM may continuously receive feedback from all parties in the conversation (e.g., via the chat interface, the communication interface module 250 and the prompt generation module 270) until a decision is reached as to what list of ingredients or recipe is desired. In one or more embodiments, instead of the chatbot agent module 260 or in addition to the chatbot agent module 260, the first LLM controls participation of the chatbot agent in the conversation. In such cases, to control participation of the chatbot agent in the conversation, the first LLM may utilize information from a catalog of items (e.g., retrieved by the prompt generation module 270 from the data store 240) about availability of different items. For example, if a found rate for a core item for a recipe is below a threshold rate, then the first LLM may generate a response signal instructing the chatbot agent to shy away from recommending that recipe.

The first LLM may be tuned (e.g., via the model serving system 150) to take multimodal inputs from one or more users of the online concierge system 140 and synthesize the multimodal inputs into a list of ingredients based on the users' consensus. Additionally, the first LLM may be tuned to constrain suggestions of ingredients and recipes based on the users' past orders and restrictions. For example, if there is a vegan participating in the conversation, the first LLM would suggest vegan-friendly recipes.

In one or more embodiments, the first LLM is re-tuned (e.g., via the model serving system 150) based on Reinforcement Learning from Human Feedback (RLHF). For example, the first LLM may be re-tuned by human feedback when being provided with inputs such as, "It's really important that there is no dairy in this order, Person B is lactose intolerant," or "Hey, we're a bit low on cash this month, can you please create a very frugal cart for us?" Additionally or alternatively, the first LLM may be re-tuned by outputs of the second LLM. For example, the second LLM is unable to identify a valid list of items within a given geographical location for a particular list of ingredients or recipe suggested by the first LLM. In such cases, the first LLM can be re-tuned to suggest alternative ingredients. Additionally or alternatively, the first LLM may be re-tuned based on informational feedback. For example, a user participating in a conversation at the chat interface disagrees with the choices the first LLM and agentic chat system generally makes. In such cases, the first LLM may be re-tuned to shift the "offense-defense" balance to be much more defensive and keep the user in the loop for more of the decision making.

In one or more embodiments, the second LLM maps the intent for the group order inferred by the first LLM to a list of actual items (e.g., cart of items) offered for purchase by a retailer associated with the online concierge system 140. In particular, the first LLM may feed the second LLM with the list of ingredients and the metadata with information about preferences of one or more users that participate in the conversation. Additionally, the prompt generation module 270 may include in a prompt for input into the second LLM information about cart sizes of previous orders for the one or more users that participate in the conversation, information about the retailer, information about availability of different items at the retailer, some other information that can be used to map the list of ingredients into the list of actual items at the retailer, or some combination thereof. For example, the information about cart sizes of previous orders included in the prompt may tune the second LLM to suggest lower cost alternatives when necessary. The prompt generation module 270 may retrieve these various features included in the prompt from, e.g., the data store 240. The prompt for input into the second LLM may further include an explicit request for the second LLM to generate the list of items at the retailer.

Based on the prompt input into the second LLM (e.g., as provided by the first LLM and optionally by the prompt generation module 270), the second LLM may generate a response with the list of items at the retailer that is obtained by mapping the list of ingredients output by the first LLM into actual items available at the retailer. In order to perform the mapping, the second LLM may require access to a catalog of items for the retailer, e.g., as available at the data store 240. The response generated by the second LLM may also include a mapping status flag. For example, the bit value of "1" for the mapping status flag may indicate a success of the mapping, whereas the bit value of "0" for the mapping status flag may indicate that mapping of the list of ingredients to the list of items was unsuccessful as the second LLM was not able to map all of the ingredients into corresponding items available at the retailer. The response generated by the second LLM may further include information about an intent for the list of items, such as an indication of whether the list of items correspond to a particular recipe or a meal.

In one or more embodiments, the response generated by the second LLM may be provided to the first LLM. Hence, the second LLM may provide the generated list of items, the mapping status flag, and the information about the intent for the list of items. The online concierge system 140 may import from the first LLM (e.g., via the order management module 220) the response generated by the second LLM, and add the list of items into a cart of one of the users that participate in the discussion. Alternatively, the online concierge system 140 may cause (e.g., via the content presentation module 210) a user interface of the user client device 100 to display the list of items along with the intent for the list of items. A user associated with the user client device 100 may then use the user interface to manually add all or some of the items to the cart.

In cases where the cart completion is not possible, the second LLM may generate an error response with the corresponding bit value of the mapping status flag and return the error response to the first LLM. The online concierge system 140 may import (e.g., via the communication interface module 250 or the chatbot agent module 260) the error response from the first LLM. The chatbot agent module 260 may then prompt the chatbot agent to inform the users via the chat interface about the unsuccessful mapping of ingredients into actual items at the retailer.

In one or more embodiments, the second LLM may be tuned and re-tuned (e.g., via the model serving system 150) using catalog data, e.g., as available at the data store 240. The second LLM may be tuned and re-tuned to know what ingredients are located at which retail locations. Additionally, the second LLM may be tuned and re-tuned to infer costs for a list of items at different retail locations, which can be used to select the most affordable retail location for an order. Additionally, as the second LLM is tuned using past order data, the second LLM may be able to suggest more affordable recipe alternatives (or list of item alternatives) when favored.

In one or more embodiments, the second LLM may be tuned and re-tuned by the first LLM. In such cases, the first LLM may feed user metadata to the second LLM, and the second LLM may be tuned with the user metadata to bias a generated list of items on the user metadata when available. For example, if at least one of the users is vegan, the second LLM may be tuned to recommend in most cases a vegan friendly recipe. Additionally, user feedback when non-vegan recipes are suggested by the second LLM may be used for re-tuning of the second LLM to reinforce how important this particular user metadata (i.e., user preference) is for future suggestions. Alternatively or additionally, the second LLM may be tuned and re-tuned based on informational feedback. The second LLM may be tuned to optimize a generated list of items for a cost when users' metadata dictates that the cost feature is important for conversion. Similarly, the second LLM may be tuned to optimize a generated list of items for dietary preferences and/or restrictions when the users' metadata indicate that these features are important for conversion.

In one or more embodiments, instead of the second LLM, the item mapping module 223 is utilized for mapping the list of ingredients generated by the first LLM to the list of items at the retailer. In such cases, the online concierge system 140 imports (e.g., via the item mapping module 223) the response from the first LLM including the list of ingredients along with the metadata with information about preferences for the one or more users that participate in the conversation. Additionally, the item mapping module 223 may retrieve (e.g., from the data store 240) information about cart sizes of previous orders for the one or more users that participate in the conversation, information about the retailer, information about availability of different items at the retailer, some other information that can be used to map the list of ingredients into the list of actual items at the retailer, or some combination thereof. The item mapping module 223 may then apply one or more mapping rules to map the list of ingredients generated by the first LLM to a catalog of items (e.g., as available at the data store 240) to generate the list of actual items at the retailer. The item mapping module 223 may also add the generated list of items to the user's cart. Alternatively, when the mapping was unsuccessful, the item mapping module 223 may send an error report to the chatbot agent module 260 that prompts the chatbot agent to inform the users via the chat interface about the unsuccessful card building.

In one or more embodiments, the third LLM places the group order after getting approval from the users that participate in the conversation. For example, once the second LLM generates the list of items and adds the list of items to the cart, the content presentation module 210 may cause the user client device to display a user interface with a notification prompting the user to approve the order. Alternatively, the chatbot agent module 260 may prompt the chatbot agent to request an order approval from the users at the chat interface. Once the user's approval is received, the third LLM may be triggered to finalize the order. In particular, upon receiving the list of items for the retailer from the second LLM, the third LLM handles order creation, generates details related to a delivery location, and handles payment processing. In one or more embodiments, the third LLM may use one or more APIs to acquire information about the user's delivery location and the user's payment information (e.g., credit card details), payment information for multiple users that participated in the conversation, etc. For the third LLM to acquire the payment information for different users, it is required that each user has already approved the access to their saved payment information.

Based on the list of items for the retailer received from the second LLM and the additional acquired inputs, the third LLM may populate a checkout flow form. Once the users confirm the order, the content presentation module 210 may redirect the users to the checkout page with the form already filled out. The third LLM may also facilitate split payments between two or more users (i.e., between disparate sources) based on the acquired payment information for multiple users.

In one or more embodiments, the third LLM generates two sets of outputs. Initially, the third LLM may output a summary of the order that is about to be placed. The content presentation module 210 may cause user interfaces of user client devices 100 associated with the users that participate in the conversation to display the summary of the order. Alternatively, the communication interface module 250 may display the summary of the order at the chat interface. Alternatively, the chatbot agent module 260 may prompt the chatbot agent to notify the users about the summary of the order. At the backend, the third LLM may fill out the checkout form and wait for users' consensus before placing the order. After the users are in agreement about the summary of the order, a corresponding approval signal is generated that triggers the third LLM to place the order for delivery. In general, after the users' consensus, the third LLM may return either a success or an error message to the group of users to inform them about the status of the order. For example, the third LLM may generate the error message if there is any issue with payment information associated with one of the users.

In one or more embodiments, the third LLM is tuned and re-tuned (e.g., via the model serving system 150) based on user order data with information about how checkout forms are most commonly filled out. The third LLM may be continuously re-tuned based on the performance of the agentic chat system. For example, if users provide substantial feedback about the choices the third LLM makes in the checkout form, then the third LLM would bias its future actions towards that feedback. Additionally or alternatively, the third LLM may be tuned based on informational feedback. For example, users that place group orders typically want their items being delivered as soon as possible. Hence, the third LLM may be tuned for assigning fast delivery methods to the group orders, metadata (e.g., as generated by the first LLM) indicate that users want to save on costs.

In one or more embodiments, the third LLM is tuned and re-tuned by the first LLM based on users' feedback as provided to the third LLM by the first LLM. For example, the first LLM may provide the following users' feedback to the third LLM for tuning the third LLM to bias its actions towards the users' desires: (1) "Why is this delivery time so far out in the future, can we make it earlier?"; (2) "Why would you set the delivery time at 8 AM? We're supposed to meet up for dinner tonight!" Note that the users' feedback can be entered via the chat interface and then passed (e.g., via the communication interface module 250) to the first LLM, and then from the first LLM to the third LLM after being parsed by the first LLM. In another example, the user specifies via the chat interface that they are hungry and want their items immediately. After this information is provided (e.g., via the communication interface module 250) to the first LLM and parsed by the first LLM, the first LLM may provide these specific users' demands to the third LLM. The third LLM may be then re-tuned to assign the order for an "ultrafast" delivery method, if possible.

In one or more embodiments, instead of the third LLM, the checkout module 225 finalizes and places the group order. In such cases, the checkout module 225 may receive the list of items for the retailer as generated by the second LLM or the item mapping module 223, as well as retrieve (e.g., from the data store 240) information about the user's delivery location and payment information for the users that participated in the conversation. Based on these inputs, the checkout module 225 may generate a summary for the order, populate the checkout form, and place the order upon the users' consensus, while facilitating splitting payments between two or more users.

Figure 3:
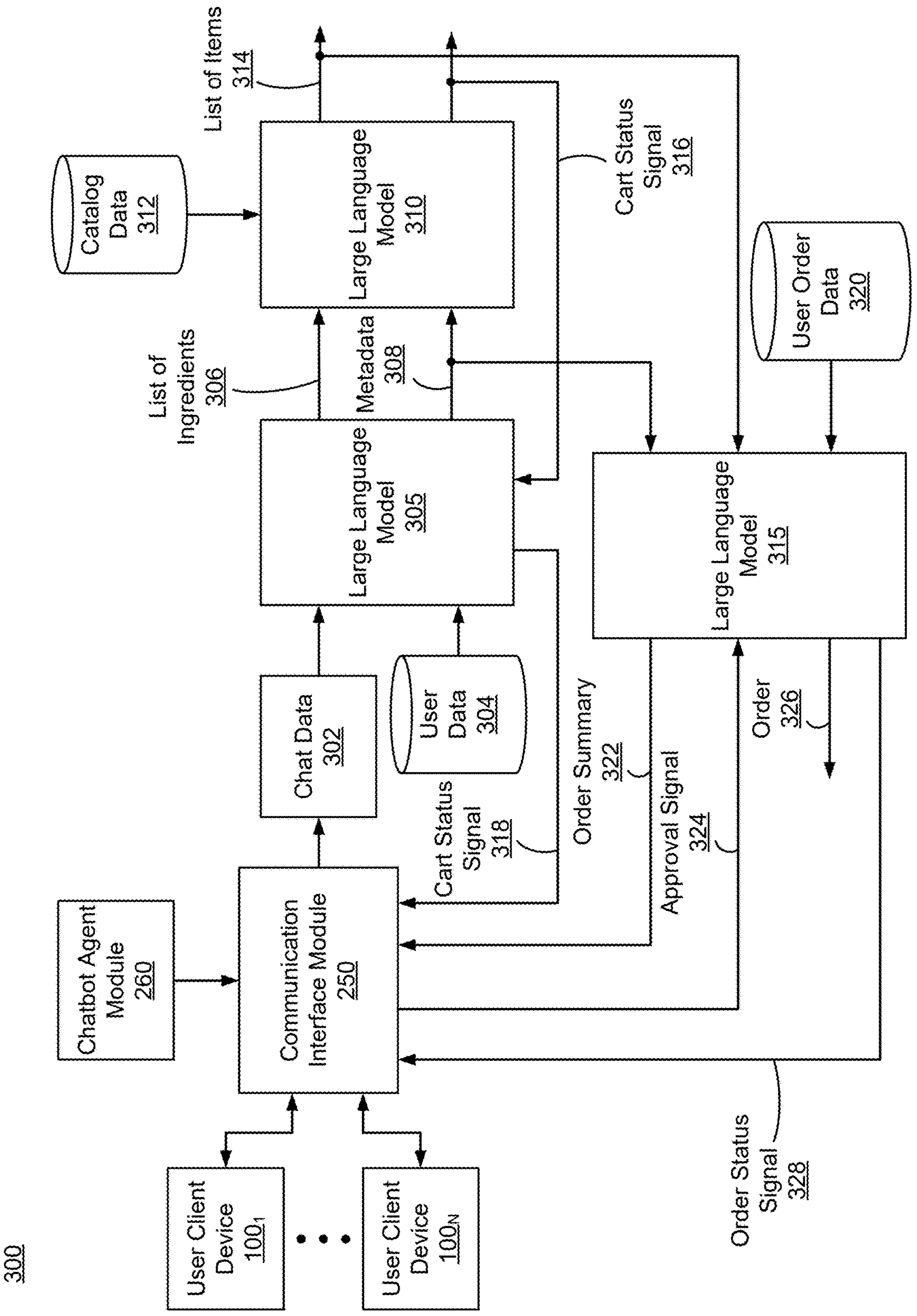
FIG. 3 illustrates an example architectural flow diagram of operating a chat interface supported by language models to place a group order at an online concierge system that is built by multiple users of the online concierge system, in accordance with one or more embodiments.

FIG. 3 illustrates an example architectural flow diagram 300 of operating a chat interface supported by language models to place a group order at the online concierge system 140 that is built by multiple users of the online concierge system 140, in accordance with one or more embodiments. The multiple users may discuss building a group order for a meal or a recipe using a chat interface of the online concierge system 140 that is available as part of an application of the online concierge system 140 running on user client devices $\mathbf{100}_1, \ldots, \mathbf{100}_N$ associated with the users. Alternatively, the users may discuss building the group order outside of the chat interface. In such cases, one of the users may use the chat interface to upload data related to the discussion about the group order (e.g., screen capture of text messages, audio recording of the discussion, etc.) The communication interface module 250 or some other module of the online concierge system 140 (e.g., the prompt generation module 270) may gather chat data 302 related to the discussion about the group order. The chat data 302 may be text data, image data (e.g., one or more images of a meal or recipe), audio data, etc. that is downloaded from the chat interface. As discussed in relation to FIG. 2, the chatbot agent controlled by the chatbot agent module 260 may also participate in the discussion about the group order. Data generated by the chatbot agent can be also gathered via the communication interface module 250 or some other module of the online concierge system 140 (e.g., the prompt generation module 270) as part of the chat data 302.

The gathered chat data 302 may be fed to an LLM 305 (e.g., a first LLM of the model serving system 150). In addition to the chat data 302, user data 304 may be also input into the LLM 305. The user data 304 may include information about the users' previous orders and/or information about the users' preferences. The user data 304 may be retrieved (e.g., via the prompt generation module 270) from the data store 240. Alternatively or additionally, the LLM may access the data store 240 via an API to retrieve at least some portion of the user data 304. Based on the chat data 302 and the user data 304, the LLM 305 may generate a list of ingredients 306 for the group order and metadata 308 associated with the users that participate in the discussion about the group order. The LLM 305 may pass the list of ingredients 306 and the metadata 308 to an LLM 310 (e.g., a second LLM of the model serving system 150). Additionally, the LLM 305 may pass at least a portion of the metadata 308 to an LLM 315 (e.g., a third LLM of the model serving system 150). The metadata 308 may include information about users' dietary preferences, information about cost constraints, information about a preferred retailer, a preferred time for delivery of the group order, a preferred user's location for delivery of the group order, payment preferences, some other user related data inferred from the chat data 302, or some combination thereof.

The LLM 310 may be initially tuned on catalog data 312 with information about actual items available at one or more retailers associated with the online concierge system 140. The LLM 310 may use the list of ingredients 306, the metadata 308 and the catalog data 312 to generate a list of items 314 available for purchase at a specific retailer. The list of items 314 may correspond to content of the meal or the recipe that includes the list of ingredients 306 but represent a list of actual items that are available at the retailer. Hence, the LLM 310 may essentially map the list of ingredients 306 into the list of items 314. In addition to the list of items 314, the LLM 310 may also output a cart status signal 316 that is indicative of whether the list of items 314 is generated successfully. For example, when the cart status signal 316 has a bit value of "1", the list of items 314 is generated successfully; and when the cart status signal 316 has a bit value of "0", the list of items 314 is not generated, e.g., due to unavailability of one or more items at the retailer. The LLM 310 may pass the cart status signal 316 to the LLM 305, and the LLM may subsequently pass a cart status signal 318 that is based on the cart status signal 316 to the communication interface module 250. The communication interface module 250 may display a notification message at the chat interface informing the users about success or failure in building the list of items for the group order. In the case of unsuccessful building of the list of items, the users may provide alternatives for certain unavailable ingredients which is then provided as additional chat data 302. The LLM 305 may then generate the adjusted list of ingredients 306, and the LLM 310 may generate the adjusted list of items 314 and the "successful" cart status signal 316 (e.g., if the provided alternates are available at the retailer). The LLM 310 may pass the list of items 314 to the LLM 315.

The LLM 315 may be tuned on user order data 320 with information about how checkout forms are most commonly filled out, user feedback in relation to a checkout form, user feedback about a delivery method (e.g., preferred fast delivery method), etc. The user order data 320 may be acquired via an API from the data store 240 and/or in real time based on users' feedback provided via the chat interface (e.g., via the communication interface module 250 and the LLM 305). Based on the list of items 314 and the user data 320, the LLM 315 may generate an order summary 322 that is passed to the communication interface module 250 and displayed at the chat interface. Upon receiving an approval signal 324 from the communication interface module 250 generated in response to the users' consensus about the order summary 322, the LLM 315 may place an order 326 by filling a checkout form. Details about the order 326 may be imported at the online concierge system 140, e.g., via the order management module. Additionally, the LLM 315 may generate an order status signal 328 that is passed to the communication interface module 250. For example, when the order status signal 328 has a bit value of "1", the group order is placed successfully for delivery; and when the order status signal 328 has a bit value of "0", there is an error in relation to the placement of the group order (e.g., due to missing payment information for one of the users that are splitting the payment). The communication interface module 250 may generate a corresponding notification message (e.g., success message or error message) that is displayed at the chat interface informing the users about a status of their group order and any action that needs to be done in order to finalize placement of the group order (e.g., adding missing payment information in the case of error message).

Figure 4:
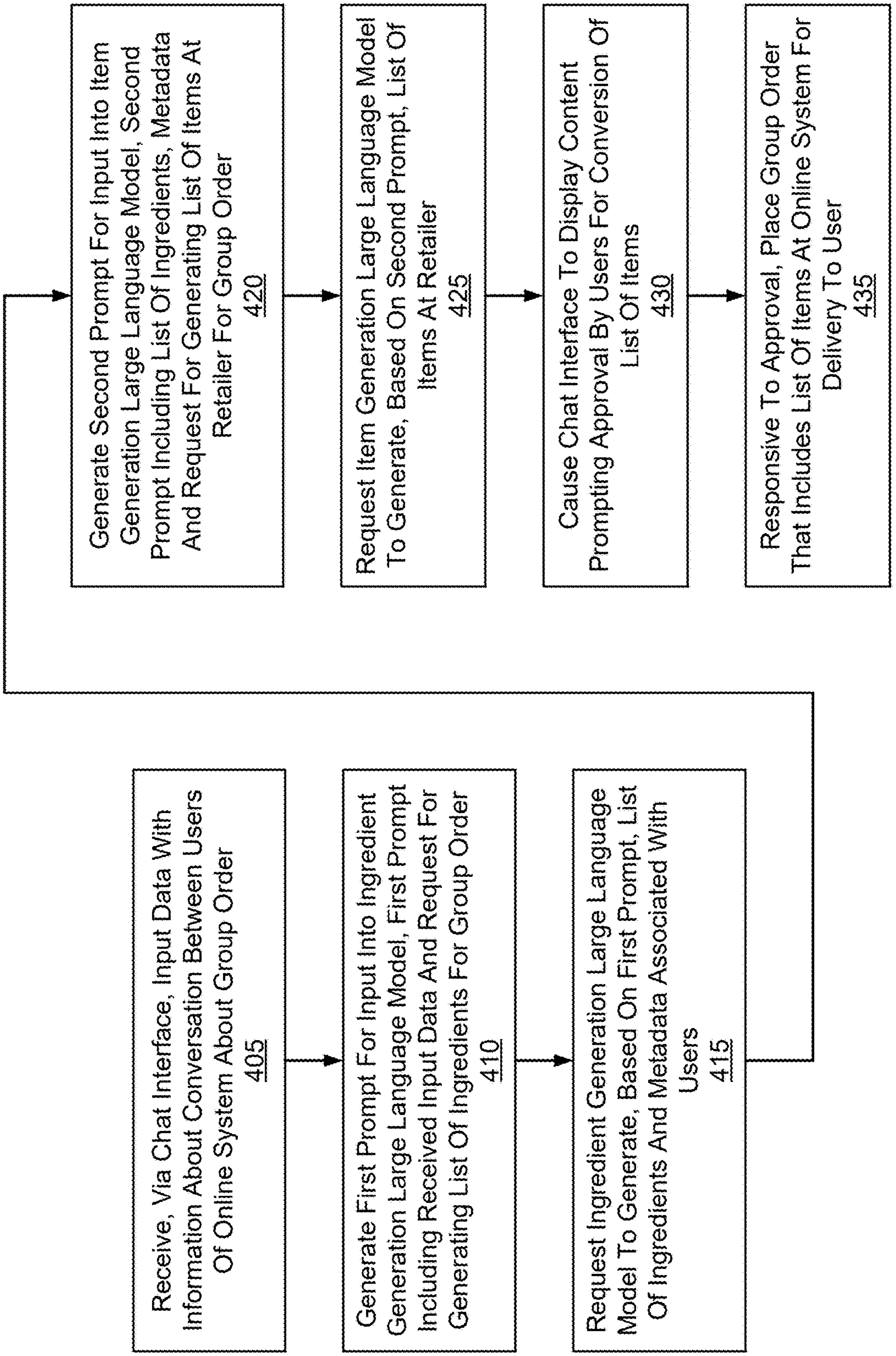
FIG. 4 is a flowchart for a method of operating a chat interface supported by language models to place a group order at an online concierge system that is built by multiple users of the online concierge system, in accordance with one or more embodiments.

FIG. 4 is a flowchart for a method of operating a chat interface supported by language models to place a group order at an online concierge system that is built by multiple users of the online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 receives 405 (e.g., at the communication interface module 250), via a chat interface of the online concierge system 140, input data with information about a conversation between a plurality of users of the online concierge system 140 about a group order for the plurality of users. The online concierge system 140 may receive the input data by receiving (e.g., at the communication interface module 250), via the chat interface, at least one of text data, image data, or speech data with the information about the conversation.

The online concierge system 140 generates 410 (e.g., via the prompt generation module 270) a first prompt for input into an ingredient generation LLM, the first prompt including the received input data and a request for generating a list of ingredients for the group order. The online concierge system 140 requests 415 (e.g., via the prompt generation module 270) the ingredient generation LLM to generate, based on the first prompt input into the ingredient generation LLM, the list of ingredients and metadata associated with the plurality of users.

In one or more embodiments, the online concierge system 140 accesses (e.g., via the communication interface module 250) an API to acquire data including at least one of information about past purchases associated with the plurality of users or a set of preferences for the plurality of users. In such cases, the online concierge system 140 may generate the first prompt for input into the ingredient generation LLM by further including (e.g., via the prompt generation module 270) the acquired data into the first prompt.

In one or more embodiments, the online concierge system 140 instructs (e.g., via the chatbot agent module 260) a chatbot agent to participate in the conversation occurring at the chat interface, wherein the chatbot agent prompts the plurality of users to enter a portion of the input data via the chat interface. The online concierge system 140 may predict (e.g., via a machine-learning prediction model) whether information in the received input data is sufficient for generating the list of ingredients. Responsive to the prediction that the information in the received input data is sufficient, the online concierge system 140 may generate (e.g., via the prompt generation module 270) the first prompt for input into the ingredient generation LLM.

In one or more embodiments, upon receiving at the ingredient generation LLM an error response from the item generation LLM in relation to the list of items, the online concierge system 140 instructs (e.g., via the chatbot agent module 260) a chatbot agent to notify the plurality of users via the chat interface about an error in creating the list of items for the group order prompting the plurality of users to enter additional input data at the chat interface in relation to the group order. The online concierge system 140 may generate (e.g., via the prompt generation module 270) the first prompt for input into the ingredient generation LLM, the first prompt further including the additional input data. And the online concierge system 140 may request the ingredient generation LLM to generate, based on the first prompt with the additional input data input into the ingredient generation LLM, an updated version of the list of ingredients.

In one or more embodiments, the online concierge system 140 receives (e.g., at the communication interface module 250), via the chat interface, a portion of the input data related to one or more dietary preferences of one or more users of the plurality of users. The online concierge system 140 may then generate the first prompt by including (e.g., via the prompt generation module 270) information about the one or more dietary preferences in the first prompt for input into the ingredient generation LLM. In one or more other embodiments, the online concierge system 140 tunes (e.g., via the model serving system 150) the ingredient generation LLM using an error response from the item generation LLM in relation to the list of items. The online concierge system 140 may generate (e.g., via the prompt generation module 270) the first prompt for input into the ingredient generation LLM, the first prompt further including the error response. The online concierge system 140 may then request (e.g., via the prompt generation module 270) the ingredient generation LLM to generate, based on the first prompt with the error response, an adjusted version of the list of ingredients.

The online concierge system 140 generates 420 (e.g., via the prompt generation module 270) a second prompt for input into an item generation LLM, the second prompt including the list of ingredients, the metadata and a request for generating a list of items at a retailer associated with the online concierge system 140 for the group order. The online concierge system 140 requests 425 (e.g., via the prompt generation module 270) the item generation LLM to generate, based on the second prompt input into the item generation LLM, the list of items at the retailer.

The online concierge system 140 causes 430 (e.g., via the communication interface module 250 or the chatbot agent module 260) the chat interface to display content prompting approval by the plurality of users for conversion of the list of items. Responsive to the approval, the online concierge system 140 places 435 (e.g., via the model serving system 150 or the checkout module 225) the group order comprising the list of items at the online concierge system 140 for delivery to a user of the plurality of users.

In one or more embodiments, the online concierge system 140 generates (e.g., via the prompt generation module 270 and/or the ingredient generation LLM) a third prompt for input into a checkout LLM, the third prompt including the list of items, a portion of the metadata, and a request for placing the group order at the online concierge system 140. The online concierge system 140 may generate the third prompt by receiving, from the ingredient generation LLM and including in the third prompt, the portion of the metadata including at least one of: a time for delivery of the group order, a location of the user for delivery of the group order, or information about payment for the group order by one or more users of the plurality of users. The online concierge system 140 may request (e.g., via the prompt generation module 270) the checkout LLM to generate, based on the third prompt input into the checkout LLM, a summary of the group order. The online concierge system 140 may receive (e.g., at the communication interface module 250), via the chat interface, the approval from the plurality of users in relation to the summary of the group order. Responsive to the received approval, the online concierge system 140 may request (e.g., via the prompt generation module 270) the checkout LLM to complete, based on the third prompt input into the checkout LLM, a checkout form for the plurality of users for placing the group order at the online system for delivery to the user.

The online concierge system 140 may receive (e.g., at the communication interface module 250), from the checkout LLM via the chat interface, a notification message informing the plurality of users about an unsuccessful placement of the group order prompting the plurality of users to provide additional user information for placing the group order at the online concierge system 140. The online concierge system 140 may generate (e.g., via the prompt generation module 270) the third prompt for input into the checkout LLM, the third prompt further including the additional user information. The online concierge system 140 may request (e.g., via the prompt generation module 270) the checkout LLM to complete, based on the third prompt with the additional user information input into the checkout LLM, an updated version of the checkout form. In one or more embodiments, the ingredient generation LLM receives, via the chat interface, a portion of the input data with information about a preferred time for delivery of the group order. The ingredient generation LLM may include the received portion of the input data with information about the preferred time for delivery in the third prompt for input into the checkout LLM.

One or more embodiments of the present disclosure are directed to the online concierge system 140 with an agentic chat system. The agentic chat system presented herein includes a chatbot agent supported by a language model that participates in a group chat and extracts a list of ingredients based on content of the group chat and other data about users retrieved from the online concierge system 140. The agentic chat system further includes secondary language models that handle actual selection of items for purchase and the checkout flow. The language models of the agentic chat system are continually re-tuned based on feedback from users, i.e., based on the experiences with past user interactions. The presented agentic chat system unlocks a growth opportunity for the online concierge system 140 as it allows multiple parties to get together to brainstorm and build carts together easily and efficiently.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, via a chat interface of the computer system, input data with information about a conversation between a plurality of users of the computer system about a group order for the plurality of users;

applying, by a chatbot agent module of the computer system, a chatbot prediction model to the input data to generate a score that is indicative of a confidence that the information provided by the conversation passes a threshold for generating a list of ingredients for the group order, wherein the chatbot prediction model is a machine-learning model trained to continually predict whether the conversation has given enough information for generating the list of ingredients;

responsive to the score being greater than a threshold score, invoking, by the chatbot agent module, a participation of a chatbot agent in the conversation at the chat interface;

responsive to the score being greater than a threshold score, generating a first prompt for input into an ingredient generation large language model (LLM), the first prompt including the received input data and a request for generating the list of ingredients for the group order;

requesting the ingredient generation LLM to generate, based on the first prompt input into the ingredient generation LLM, the list of ingredients and metadata associated with the plurality of users;

generating a second prompt for input into an item generation LLM, the second prompt including the list of ingredients, the metadata and a request for generating a list of items for the group order;

requesting the item generation LLM to generate, based on the second prompt input into the item generation LLM, the list of items;

causing, by the chatbot agent, the chat interface to display content prompting approval by the plurality of users for conversion of the list of items; and responsive to the approval, placing the group order comprising the list of items at the computer system for delivery to a user of the plurality of users.

2. The method of claim 1, wherein receiving the input data comprises:

receiving, via the chat interface, at least one of text data, image data, or speech data with the information about the conversation.

3. The method of claim 1, further comprising:

accessing an application programming interface (API) of the computer system to acquire data comprising at least one of information about past purchases associated with the plurality of users or a set of preferences for the plurality of users, wherein generating the first prompt further comprises including the acquired data into the first prompt.

4. The method of claim 1, wherein generating the first prompt comprises:
instructing the chatbot agent to participate in the conversation occurring at the chat interface, wherein the chatbot agent prompts the plurality of users to enter a portion of the input data via the chat interface;
predicting whether information in the received input data is sufficient for generating the list of ingredients; and
responsive to the prediction that the information in the received input data is sufficient, generating the first prompt for input into the ingredient generation LLM.

5. The method of claim 1, further comprising:
upon receiving at the ingredient generation LLM an error response from the item generation LLM in relation to the list of items, instructing the chatbot agent to notify the plurality of users via the chat interface about an error in creating the list of items for the group order prompting the plurality of users to enter additional input data at the chat interface in relation to the group order;
generating the first prompt for input into the ingredient generation LLM, the first prompt further including the additional input data; and
requesting the ingredient generation LLM to generate, based on the first prompt with the additional input data input into the ingredient generation LLM, an updated version of the list of ingredients.

6. The method of claim 1, wherein generating the first prompt comprises:
receiving, via the chat interface, a portion of the input data related to one or more dietary preferences of one or more users of the plurality of users; and
including information about the one or more dietary preferences in the first prompt for input into the ingredient generation LLM.

7. The method of claim 1, further comprising:
tuning the ingredient generation LLM using an error response from the item generation LLM in relation to the list of items;
generating the first prompt for input into the ingredient generation LLM, the first prompt further including the error response; and
requesting the ingredient generation LLM to generate, based on the first prompt with the error response, an adjusted version of the list of ingredients.

8. The method of claim 1, wherein placing the group order comprises:
generating a third prompt for input into a checkout LLM, the third prompt including the list of items, a portion of the metadata, and a request for placing the group order at the computer system;
requesting the checkout LLM to generate, based on the third prompt input into the checkout LLM, a summary of the group order;
receiving, via the chat interface, the approval from the plurality of users in relation to the summary of the group order; and
responsive to the received approval, requesting the checkout LLM to complete, based on the third prompt input into the checkout LLM, a checkout form for the plurality of users for placing the group order at the computer system for delivery to the user.

9. The method of claim 8, wherein generating the third prompt comprising:
receiving, from the ingredient generation LLM, the portion of the metadata including at least one of a time for delivery of the group order, a location of the user for delivery of the group order, or information about payment for the group order by one or more users of the plurality of users; and
including, in the third prompt, at least one of the time for delivery of the group order, the location of the user for delivery of the group order, or the information about payment for the group order.

10. The method of claim 8, further comprising:
receiving, from the checkout LLM and via the chat interface, a notification message informing the plurality of users about an unsuccessful placement of the group order prompting the plurality of users to provide additional user information for placing the group order at the computer system;
generating the third prompt for input into the checkout LLM, the third prompt further including the additional user information; and
requesting the checkout LLM to complete, based on the third prompt with the additional user information input into the checkout LLM, an updated version of the checkout form.

11. The method of claim 8, wherein generating the third prompt comprises:
receiving, at the ingredient generation LLM and via the chat interface, a portion of the input data with information about a preferred time for delivery of the group order; and
including, via the ingredient generation LLM, the information about the preferred time for delivery of the group order in the third prompt for input into the checkout LLM.

12. A computer program product comprising a non-transitory computer readable storage medium having instructions encoded thereon that, when executed by a processor, cause the processor to perform steps comprising:
receiving, via a chat interface of a computer system, input data with information about a conversation between a plurality of users of the computer system about a group order for the plurality of users;
applying, by a chatbot agent module of the computer system, a chatbot prediction model to the input data to generate a score that is indicative of a confidence that the information provided by the conversation passes a threshold for generating a list of ingredients for the group order, wherein the chatbot prediction model is a machine-learning model trained to continually predict whether the conversation has given enough information for generating the list of ingredients;
responsive to the score being greater than a threshold score, invoking, by the chatbot agent module, a participation of a chatbot agent in the conversation at the chat interface;
responsive to the score being greater than a threshold score, generating a first prompt for input into an ingredient generation large language model (LLM), the first prompt including the received input data and a request for generating the list of ingredients for the group order;
requesting the ingredient generation LLM to generate, based on the first prompt input into the ingredient generation LLM, the list of ingredients and metadata associated with the plurality of users;
generating a second prompt for input into an item generation LLM, the second prompt including the list of ingredients, the metadata and a request for generating a list of items for the group order;
requesting the item generation LLM to generate, based on the second prompt input into the item generation LLM, the list of items;
causing, by the chatbot agent, the chat interface to display content prompting approval by the plurality of users for conversion of the list of items; and
responsive to the approval, placing the group order comprising the list of items at the computer system for delivery to a user of the plurality of users.

13. The computer program product of claim 12, wherein the instructions further cause the processor to perform steps comprising:
receiving the input data by receiving, via the chat interface, at least one of text data, image data, or speech data with the information about the conversation.

14. The computer program product of claim 12, wherein the instructions further cause the processor to perform steps comprising:
instructing the chatbot agent to participate in the conversation occurring at the chat interface, wherein the chatbot agent prompts the plurality of users to enter a portion of the input data via the chat interface;
predicting whether information in the received input data is sufficient for generating the list of ingredients; and
responsive to the prediction that the information in the received input data is sufficient, generating the first prompt for input into the ingredient generation LLM.

15. The computer program product of claim 12, wherein the instructions further cause the processor to perform steps comprising:
upon receiving at the ingredient generation LLM an error response from the item generation LLM in relation to the list of items, instructing the chatbot agent to notify the plurality of users via the chat interface about an error in creating the list of items for the group order prompting the plurality of users to enter additional input data at the chat interface in relation to the group order;
generating the first prompt for input into the ingredient generation LLM, the first prompt further including the additional input data; and
requesting the ingredient generation LLM to generate, based on the first prompt with the additional input data input into the ingredient generation LLM, an updated version of the list of ingredients.

16. The computer program product of claim 12, wherein the instructions further cause the processor to perform steps comprising:
receiving, via the chat interface, a portion of the input data related to one or more dietary preferences of one or more users of the plurality of users; and
generating the first prompt by including information about the one or more dietary preferences in the first prompt for input into the ingredient generation LLM.

17. The computer program product of claim 12, wherein the instructions further cause the processor to perform steps comprising:
tuning the ingredient generation LLM using an error response from the item generation LLM in relation to the list of items;
generating the first prompt for input into the ingredient generation LLM, the first prompt further including the error response; and
requesting the ingredient generation LLM to generate, based on the first prompt with the error response, an adjusted version of the list of ingredients.

18. The computer program product of claim 12, wherein the instructions further cause the processor to perform steps comprising:
generating a third prompt for input into a checkout LLM, the third prompt including the list of items, a portion of the metadata and a request for placing the group order at the computer system;
requesting the checkout LLM to generate, based on the third prompt input into the checkout LLM, a summary of the group order;
receiving, via the chat interface, the approval from the plurality of users in relation to the summary of the group order; and
responsive to the received approval, requesting the checkout LLM to complete, based on the third prompt input into the checkout LLM, a checkout form for the plurality of users for placing the group order at the computer system for delivery to the user.

19. The computer program product of claim 18, wherein the instructions further cause the processor to perform steps comprising:
receiving, from the checkout LLM and via the chat interface, a notification message informing the plurality of users about an unsuccessful placement of the group order prompting the plurality of users to provide additional user information for placing the group order at the computer system;
generating the third prompt for input into the checkout LLM, the third prompt further including the additional user information; and
requesting the checkout LLM to complete, based on the third prompt with the additional user information input into the checkout LLM, an updated version of the checkout form.

20. A computer system comprising:
a processor; and
a non-transitory computer-readable storage medium having instructions that, when executed by the processor, cause the computer system to perform steps comprising:
receiving, via a chat interface of the computer system, input data with information about a conversation between a plurality of users of the computer system about a group order for the plurality of users;
applying, by a chatbot agent module of the computer system, a chatbot prediction model to the input data to generate a score that is indicative of a confidence that the information provided by the conversation passes a threshold for generating a list of ingredients for the group order, wherein the chatbot prediction model is a machine-learning model trained to continually predict whether the conversation has given enough information for generating the list of ingredients;
responsive to the score being greater than a threshold score, invoking, by the chatbot agent module, a participation of a chatbot agent in the conversation at the chat interface;
responsive to the score being greater than a threshold score, generating a first prompt for input into an ingredient generation large language model (LLM), the first prompt including the received input data and a request for generating the list of ingredients for the group order;

requesting the ingredient generation LLM to generate, based on the first prompt input into the ingredient generation LLM, the list of ingredients and metadata associated with the plurality of users;

generating a second prompt for input into an item generation LLM, the second prompt including the list of ingredients, the metadata and a request for generating a list of items for the group order;

requesting the item generation LLM to generate, based on the second prompt input into the item generation LLM, the list of items;

causing, by the chatbot agent, the chat interface to display content prompting approval by the plurality of users for conversion of the list of items; and responsive to the approval, placing the group order comprising the list of items at the computer system for delivery to a user of the plurality of users.

* * * * *